United States Patent Office 3,174,998
Patented Mar. 23, 1965

3,174,998
SOLUBLE SULFONATED LEONARDITE AND
PREPARATION THEREOF
Evan Baltazzi, Brookfield, and Elmar Wilip, Oak Park, Ill., assignors to Nalco Chemical Company, Chicago, Ill., a corporation of Delaware
No Drawing. Filed Aug. 31, 1961, Ser. No. 135,143
6 Claims. (Cl. 260—507)

The invention relates to a method for producing water soluble sulfonated leondardite. It is also concerned with novel products made by sulfonating leonardite under certain specific conditions.

Leonardite is a coal-like substance similar to lignite. Although physically simliar, leondardite has a richer oxygen content than does lignite. Generally, leonardite contains from 28 to 29% by weight of oxygen, whereas lignite contains from 19 to 20% by weight.

The high oxygen content of leonardite has been ascribed to the presence of carboxylic acid groups in the leonardite molecule. Spectral analysis has indicated that leonardite is capable of being generically defined as mixed salts of humic acids. Although not proven conclusively, leonardite is probably a large, aryl-carboxylic polymeric molecule.

Leonardite has little value as a fuel. It has been investigated to some extent as a chemical of commerce, but for most purposes the material is not particularly satisfactory in most areas of industrial chemistry. One of the chief difficulties in commercially exploiting leonardite residues in its poor solubility characteristics in both aqueous and organic media. While the material is soluble in aqueous alkaline solutions, it is relatively insoluble in water and common solvents such as alcohols, ketones, and the like. Since the carboxylic acid portion of the molecule renders it interesting from the standpoint of being a useful chemical, nevertheless, due to its poor solubility characteristics the carboxylic acid portion of the molecule is not capable of being fully utilized.

Conventional research in the modification of humic acids has been directed to oxidative degradation of the molecule whereby the large organic structure is broken up into smaller chemical units. This degradative approach has met with some success in that carboxylic acids have been produced, but in breaking up the molecule many of its valuable properties, e.g., high molecular weight and its carbocyclic-aromatic structure are frequently lost.

It would be a valuable contribution to the art if it would be possible to chemically modify leonardite whereby its molecular configuration would be substantially unaffected. This modification should also allow further chemical processing to be performed on the molecule. It would be of further advantage if leonardite could be chemically treated whereby its solubility characteristics would be substantially modified without breakdown or degradation of its molecular configuration. It therefore becomes an object of the invention to provide a method for modifying leonardite by sulfonation whereby sulfonic acid groups are introduced into the molecule.

Another object is to provide modified leonardites which contain sulfonic acid groups and which have the property of being soluble in certain organic solvents such as acetone, glycol ethers, and the like.

A further object is to provide novel leonardite products which are useful as chemical intermediates and which may be acted upon by various chemical reagents which are capable of further modifying and improving its chemical and physical characteristics. Other objects will appear hereinafter.

In accordance with the invention it has been found that leonardite may be rendered soluble in water and in common organic solvents, by sulfonating with oleum in the presence of a catalytic amount of a vanadium soulfonation catalyst. In particular, leonardite is added to oleum which contains at least 5% by weight, preferably 15–30% by weight, and most preferably, 20–30% by weight $SO_3$ under conditions whereby the temperature during the addition is not allowed to exceed 150° C. When the leonardite is added to oleum, the reaction is exothermic with quantities of heat being evolved. To keep the temperature at 150° C. or less, several methods may be used. The oleum may be cooled by external cooling means during the addition. A preferred method resides in slowly adding the leonardite to the oleum over a period of time ranging between 1 and 6 hours, and preferably 3–4 hours. Under these conditions, the temperature of the leonardite-oleum reaction mass will usually be within the range of 70–90° C. This temperature range is preferred.

As indicated, the reaction is conducted in the presence of vanadium sulfonation catalysts. The catalyst is preferably a blend of vanaduim pentoxide and an alkali metal sulfate combined in a weight ratio of 1:2–2:1, a preferred ratio is 1:1. Although this particular vanadium catalyst is preferred, vanadium pentoxide or other vanadium containing catalytic compounds may be used. The amount of vanadium catalyst based on the weight of the leonardite, is at least 0.2% and is preferably 2–4% by weight although larger amounts may be used. The catalyst may be added to either the leonardite or to the oleum with the latter being the preferred addition point in the system.

After the leondardite has been added to the oleum, as specified above, solid sulfonated leondardite is separated from the reaction mass by filtering, preferably with cooling. The solids thus recovered are washed with water and air dried for 2–26 hours at temperatures ranging from 25–150° C. In a preferred embodiment of the invention, this drying is conducted at a temperature of about 105° C. for a period of about 12 hours.

To illustrate the manufacture of the water soluble sulfonated leonardite the following examples are presented:

*Example I*

500 g. of dry leonardite was added gradually to 4000 g. of fuming $H_2SO_4$ (20% $SO_3$) in the presence of 10 g. $V_2O_5$+10 g. $Na_2SO_4$ as a catalyst. The reaction was exothermic. The addition of leonardite was completed in four hours during which time the temperature was kept at 60–80° C. The solid sulfonated compound was separated by filtering, washed and then dried at 150° C. for 15 hours. The sulfur content was found to be 22.7%. The compound was soluble in water, acetone and "methyl Cellosolve" (monomethyl glycol ether).

*Example II*

600 g. of dry leonardite was added gradually to 3000 g. of fuming $H_2SO_4$ (30% $SO_3$) in the presence of 5 g. $V_2O_5$+5 g. $Na_2SO_4$ as a catalyst. The addition was completed in three hours during which time the temperature was kept at 70–80° C. The mixture was cooled to 40° C., poured on ice, and filtered. The solid reaction product which is separated by filtering was washed with water, and then dried at 105° C. for 12 hours. The sulfur content was determined to be 15.6%, and the final product was soluble in water, acetone, "methyl Cellosolve" and dimethyl formamide.

*Example III*

1400 g. of dry leonardite was added gradually to 10,000 g. of fuming $H_2SO_4$ (30% $SO_3$) in the presence of 20 g. $V_2O_5$+20 g. $Na_2SO_4$ as a catalyst. The temperature during the addition was kept at 90–100° C., the addition being completed in three hours. After filtering the solid compound thus separated was washed with water and dried at 90–100° C. for 2 hours and then for 24 hours at room temperature (25° C.). The sulfur content proved to be 8%, and final product was soluble in water, acetone, dimethyl formamide and "methyl Cellosolve."

*Example IV*

The same conditions as Example I were used except the catalyst was omitted and the sulfuric acid was 85% in strength. At the end of the reaction the product was found to be insoluble in water, acetone and dimethyl formamide.

The above examples show typical examples of preparation of products of the invention to obtain a content of 8–25% by weights of sulfur. By varying the conditions as specified herein, it is possible to vary the sulfur content within the range of 5–30% by weight of the leonardite.

The compositions of the invention are soluble in such common organic solvents as acetone, glycol ethers, e.g., the well-known "Carbitol" solvents, dimethyl formamide and the like.

The products of the invention find usefulness as components of surfactants, rust inhibitors, lubricating oil, detergents, and the like.

Having thus described our invention, it is claimed as follows:

1. A method for producing a water soluble sulfonated leonardite which comprises the steps of adding one part by weight of leonardite to 5–8 parts by weight of oleum which contains 5–30% by weight of $SO_3$ in the presence of a catalytic amount of a vanadium sulfonation catalyst to provide a leonardite-oleum reaction mass, maintaining the temperature during said addition at not greater than about 150° C., mechanically separating the solid water-soluble sulfonated leonardite from the reaction mixture, washing said separated solid until free from acid, and drying said sulfonated leonardite.

2. A method for producing a water soluble leonardite which comprises the steps of adding one part by weight of leonardite to 5–8 parts by weight of oleum which contains from 20–30% by weight of $SO_3$ in the presence of 0.2–4% by weight of a catalyst which comprises vanadium pentoxide and an alkali metal sulfate combined in a weight ratio of 1:1, to produce a leonardite-oleum reaction mass, maintaining the temperature during said addition within the range of 70–90° C., with the addition time being between 3 and 4 hours, mechanically separating the solid water-soluble sulfonated leonardite from said reaction mass, washing said separated solid until free from acid, and drying the leonardite-oleum reaction product for 2–26 hours at a temperature between 25 and 150° C.

3. The method of claim 1 where the oleum contains from 15–30% by weight of $SO_3$, the leonardite is added to the oleum over a period of time ranging between 1 and 6 hours, and the temperature during said addition is maintained at 70–150° C.

4. The method of claim 1 where the oleum contains from 20–30% by weight $SO_3$, the leonardite is added to the oleum over a period of time ranging between 3 and 4 hours, and the temperature during said addition is maintained at 70–90° C.

5. The method of claim 4 where the vanadium catalyst is a mixture of $V_2O_5$ and an alkali metal sulfate combined in a weight ratio of from 1:2 to 2:1.

6. A sulfonated leonardite which is soluble in water, acetone and glycol ethers and which is further characterized as containing from 5 to 30% by weight of sulfur, said sulfonated leonardite being obtained by the method of claim 1.

References Cited in the file of this patent

UNITED STATES PATENTS

| | | |
|---|---|---|
| 2,206,007 | Liebkenecht | June 25, 1940 |
| 2,378,307 | Liebkenecht | June 12, 1945 |
| 2,674,594 | Lewis et al. | Apr. 6, 1954 |
| 2,782,230 | Seaton | Feb. 19, 1957 |

OTHER REFERENCES

Fowkes et al.: U.S. Bureau of Mines, Rept. Invest. No. 5611, 1960, 12 pages.

Groggins: Unit Processes in Organic Synthesis, 4th edition, 1952, pp. 307, 310.